May 16, 1961 G. R. MADLAND ET AL 2,984,740

PORTABLE RADIO

Filed Dec. 14, 1956

INVENTORS.
Glen R. Madland.
Dominic R. Errichiello,
By Mueller and Aichele
Atty's.

United States Patent Office
2,984,740
Patented May 16, 1961

2,984,740

PORTABLE RADIO

Glen R. Madland, Elmhurst, and Dominic Errichiello, Melrose Park, Ill., assignors to Motorola, Inc., Chicago, Ill., a corporation of Illinois Filed Dec. 14, 1956, Ser. No. 628,273

2 Claims. (Cl. 250—14)

Figures 1, 2, 3, 4, 5:
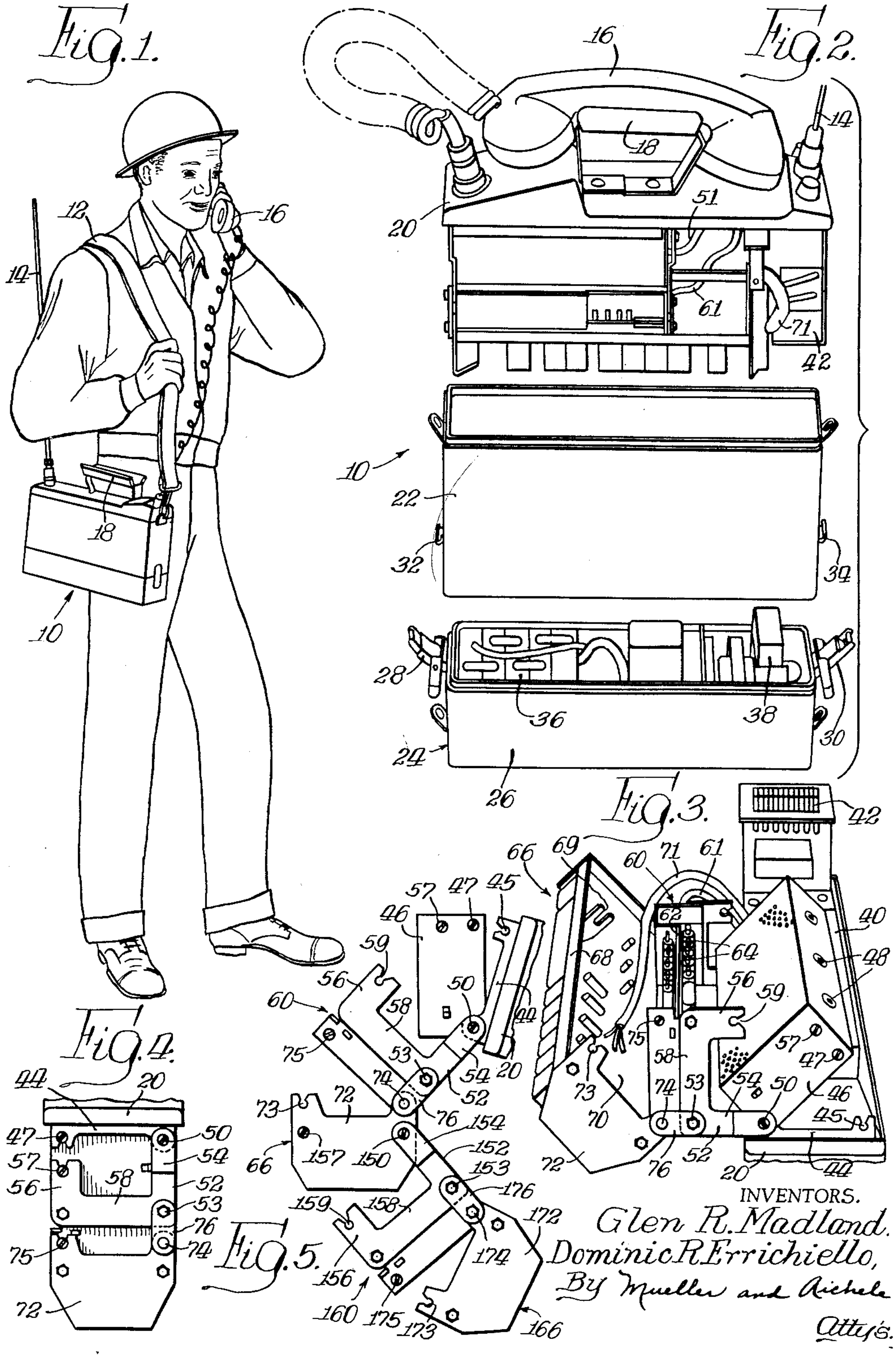

This invention relates to new and useful improvements in portable electronic equipment and more particularly to a portable radio transmitter-receiver assembly.

In recent years there has arisen a very substantial demand for small portable electronic equipment and particularly for small portable radio transmitter-receiver units which are readily adaptable for field communications. In the development of small portable communications equipment the use of printed circuit panel assemblies and miniature electronic components such as miniature electron tubes and transistors has made possible the manufacture of much smaller equipment than was previously practical. In the development of small compact communications equipment using printed circuit panel assemblies it is necessary to arrange the panels in closely stacked relation. This arrangement of printed circuit panels produces a compact unit but one which is not easily disassembled for servicing.

It is therefore one object of this invention to provide a new and improved electronic chassis assembly including a plurality of chassis components which are easily accessible for servicing.

Another object of this invention is to provide a new and improved portable radio transmitter-receiver assembly which is light, compact and easily assembled and disassembled for servicing.

A further object of the invention is to provide a communication transmitter-receiver formed of a plurality of sub-assemblies which may be assembled in various combinations to provide a plurality of different units made up of standard sub-assemblies.

One of the features of this invention is the provision of an electronic chassis assembly including a plurality of separate chassis panels positioned in stacked relation and hinged together to provide ready access to individual panels for servicing.

Another feature of this invention is the provision of a portable radio transmitter-receiver assembly having a separate receiver, transmitter, and transmitter power amplifier in separate panel-like chassis members and hinged together along one side so that individual chassis members may be unfolded away from the others for ready access for servicing.

Another feature of this invention is the provision of a radio transmitter-receiver assembly in which there is provided separate receiver, transmitter, and transmitter power amplifier assemblies, assembled on printed circuit panels and supported in metal frames as separate chassis members, with the chassis having provisions for hinged connections so that a plurality of chassis may be connected together as desired, and the individual chassis members may be unfolded from the others for ready access for servicing.

A further feature of this invention is the provision of a portable radio transmitter-receiver assembly having a plurality of metal chassis frames supporting printed circuits having tunable components thereon and pivotally connected so that individual chassis members may be unfolded for servicing, in which the tunable components are positioned for adjustment while the assembly is in an unopened position.

In the accompanying drawings, to be taken as part of this specification, there is clearly and fully illustrated a preferred embodiment of this invention, in which drawings, Fig. 1 is a view of a man carrying the portable radio transmitter-receiver assembly of this invention, Fig. 2 is an exploded view of the portable radio transmitter-receiver assembly with a power unit assembly removed from the base, and the casing removed from the cover to show the transmitter-receiver assembly mounted thereon, Fig. 3 is an end perspective view of the portable radio transmitter-receiver assembly with the cover removed and the individual chassis members unfolded from one another for servicing, Fig. 4 is an end view of the portable radio transmitter-receiver assembly with the power unit and casing removed and showing the hinged construction which permits the unfolding of individual chassis members from each other, and Fig. 5 is an end view of a portable radio transmitter-receiver assembly having additional components pivotally connected thereon.

This invention consists of a new and improved portable electronic chassis assembly of a general application but of more particular application to a portable radio transmitter-receiver assembly. In this electronic chassis assembly there are provided a plurality of individual chassis members which are generally panel shaped and which each contain separate and distinct electronic circuit stages thereon. The separate circuit stages on each chassis assembly are sometimes referred to as "modules" and may be connected together in different arrangements to provide desired electronic circuit arrangements. In a portable radio transmitter-receiver assembly the separate "modules" include chassis assemblies having separate receiver, transmitter, and transmitter amplifier circuits thereon. The individual chassis assemblies are preferably formed of printed circuit panels having miniature electronic components, such as miniature electron tubes and transistors thereon and arranged in a stacked relation to provide a small compact light-weight assembly. The individual chassis members are arranged with a hinged construction along one edge so that each chassis member while electrically connected may be unfolded away from the others for easy access to the printed circuit panels and the components thereon for servicing. Since the frames for the separate chassis members are metal and since there are tunable components on the various chassis members which may be adversely affected by proximity to metal, the various tunable components for each of the chassis members are arranged so that they are accessible when the chassis members are in a closed position, thus permitting the circuits to be turned in the normal assembled position of the chassis members and their components.

Referring to the drawing by numerals of reference and more particularly to Fig. 1 there is shown a man carrying a portable radio transmitter-receiver assembly 10 which is manufactured according to this invention. The transmitter-receiver assembly 10 is small and lightweight and carried by a shoulder strap 12. The unit is provided with an antenna 14 and a microphone-speaker handset 16 which may be carried on a cradle portion of a handle 18 when not in use. The portable transmitter-receiver assembly 10 includes a cover member 20, a casing 22 which incloses the transmitter and receiver and a power pack or power supply unit 24 which is arranged to be secured to the casing 22. A small loudspeaker may be secured to the cover member 20 and provides sound through an opening therein. If a separate loudspeaker is used a small hand microphone may be used in conjunction therewith to replace the microphone-speaker handset 16. The power supply unit 24 includes a casing 26 and hinged toggle latches 28 and 30 which connect to brackets 32 and 34 on the casing 22. The power pack 24 includes a suitable group of batteries 36 and a connector member 38 for making a connection to the transmitter-receiver assembly. The batteries 36 may be dry cells or may be 6–12 v. rechargeable nickel-cadmium cells, or they may be an external source of 6–12 volts such as found in a vehicle.

The cover member 20 has an audio amplifier stage 40 secured thereon and a connector 42 which is adapted to make electrical contact with the connector 38 on the power pack 24. The cover member 20 has a supporting bracket 44 thereon. A transmitter power amplifier chassis 46 is pivotally connected on the bracket 44 as at 50 and has a lock screw 47 which fits a notch 45 on the bracket 44 for holding the power amplifier chassis in position against the cover member 20. The power amplifier chassis 46 has one or more components therein which may require tuning and which are accessible as at 48 for tuning adjustment without requiring the dismantling of the chassis. A U-shaped hinge member 52 is provided which has leg portions 54 and 56 and a base portion 58, with a leg portion 54 being pivotally connected to the bracket 44 at 50. The leg 56 of the hinge 52 has a notched portion 59 which fits over a lock screw 57 on the power amplifier chassis and may be retained in position thereby.

A transmitter chassis 60 is supported on the base portion 58 of the hinge 52 and includes a printed circuit panel 62 supported in a metal frame. The printed circuit panel 62 has the electronic components and circuit connections for a complete transmitter circuit. Electronic components 64 on the panel 62 which require tuning are positioned for adjustment without disassembly or opening up of the printed circuit panel and transmitter chassis assembly.

There is also provided a receiver chassis 66 which includes a metal supporting frame 68 carrying a printed circuit panel 70 with the desired circuit pattern and electronic components thereon. The receiver chassis 66 is secured to a hinge plate member 72 which is pivotally connected as at 74 to a link hinge 76, the other end of which is connected at 53 to the base portion 58 of the U-shaped hinge 52. The supporting plate or hinge plate 72 has a notched portion 73 which fits over a lock screw 75 on the transmitter chassis 60 and is operable to secure the receiver chassis in place. The receiver chassis also has a notched bracket member 69 which fits over a lock screw at the other end of the transmitter chassis.

In operation this assembly is in a closed position as shown in Figs. 2 and 4 with the separate chassis members being positioned in closely stacked relation. The casing 22 covers the transmitter and receiver chassis which are secured to the cover member 20. The power pack 24 is fastened to the casing 22 by the latches 28 and 30. The receiver, transmitter, and transmitter amplifier are connected by electrical wiring 51, 61 and 71 to the power source and to the speaker amplifier stage in the cover 20 to provide complete transmitter and receiver circuits. The transmission and receiving of signals is through the handset 16 which has the usual switch arrangement for switching between transmitting and receiving operations.

When it is necessary to service any parts of this transmitter-receiver assembly the power pack 24 and casing 22 are removed from the cover 20 to expose the transmitter, amplifier, and receiver sections. The lock screws 75, 57, and 47 may then be released and individual ones of the chassis members may be unfolded as indicated in Fig. 3 to expose any of the chassis members for access to the components and circuits thereon for servicing. The link 76 is not fastened to the frame of the transmitter chassis at the hinge point 74 and thus the receiver chassis 66 may be pivoted more completely away from the transmitter chassis.

The transmitter-receiver construction which has just been described makes use of several unit chassis members or "modules" which may be hinged together in the manner just described for easy assembly and disassembly for servicing. In the transmitter-receiver forming the principal embodiment of this invention there were shown three chassis members hinged together and to the circuit stage carried on the cover member. In Fig. 5 there is shown another embodiment of this invention in which additional circuit components or "modules" may be added to an electronic chassis assembly or a transmitter-receiver assembly to provide additional amplification or additional communication channels which may be desired. In this embodiment of the invention the first three chassis members and the cover are identical to the principal embodiment of the invention and are given the same reference numerals and have the same general function. To these chassis members which are hinged together there are added additional chassis members 160 and 166 which are hinged together and hinged on the chassis member 66 by a U-shaped hinge member 152 and a link hinge 176 which are the same in construction as the U-shaped hinge 52 and link hinge 76. The U-shaped hinge 152 has leg portions 154 and 156 and a base portion 158. The hinge 152 is hinged to the chassis member 166 at 150 and has a notched portion 159 which fits over a lock screw 157. Similarly the link hinge 176 is pivoted to the base portion 158 of the hinge 152 as at 153 and is hinged at 174 to the end plate 172 of chassis member 176. The end plate 172 has a notched portion 173 which fits over a lock screw 175 and is adapted to be secured into position thereby. By using a suitable combination of basic chassis assemblies or "modules" it is possible to combine a number of electronic functions in the same portable apparatus. For example, additional power amplification stages may be added as well as additional communication channels as to provide communication in two systems which operate at different frequencies. As in the case of the principal embodiment of the invention, the separate chassis members may be pivoted away from one another and hinged opened in a book-like manner to expose individual ones of the chassis members for servicing.

We claim:

1. A portable radio transmitter-receiver assembly, including in combination, a casing having a cover, a power supply unit removably carried on said casing, said cover having supported thereon and within said casing a plurality of chassis members including printed circuit panels and electronic components mounted thereon, said cover having mounted thereon a connector to said power supply unit and an audio amplifier stage, one of said chassis members comprising a radio receiver unit, the second of said chassis members comprising a radio transmitter unit, the third chassis member comprising a transmitter power amplifier, said chassis members being arranged in stacked relation with said cover overlying said power amplifier chassis member, electrical connectors interconnecting said chassis members and said audio amplifier stage to form a complete radio transmitter-receiver circuit, a supporting bracket on said cover member, one of said chassis members being pivotally mounted on said bracket, a U-shaped hinge having two leg portions and a base portion and pivotally connected to said bracket at the end of one of said leg portions, a second one of said chassis members being secured to the base portion of said U-shaped hinge, a second hinge comprising a link pivotally mounted at one end to the base portion of said U-shaped hinge and pivotally connected at the other end to the third of said chassis members, and said hinges providing pivotal connections so that each chassis member may be unfolded in a book-like manner for access to said printed circuit panels and the electronic components thereon for servicing.

2. A portable electronic assembly including in combination, a cover, an open ended casing removably fitted at one end thereof to said cover, a power supply unit removably fitted to said casing at the other end thereof, said cover having supported thereon a plurality of chassis members with electronic components mounted thereon, electrical connections interconnecting said chassis members to form a complete electronic unit, said cover and said power supply unit having mounted thereon fixed complementary interengaged connectors so positioned that when said cover, said casing and said power supply unit are all assembled together said interengaging connectors electrically contact each other to provide electrical connections between said electronic unit and said power supply unit, said chassis members being arranged in a mechanically interconnected stacked relation parallel with said cover to fit within said casing, hinge means supporting said chassis members for pivotal movement relative to one another so that each chassis member may be unfolded for access to the electronic components thereon when said cover and said chassis members are removed from said casing for servicing the assembly, and fastening means detachably connecting adjacent edge portions of said chassis members and acting in cooperation with said hinge means to hold said chassis members in secure stacked relationship to said cover, to hold said chassis members in position when said cover is assembled to said casing and said power supply unit.

References Cited in the file of this patent

UNITED STATES PATENTS

| | | |
|---|---|---|
| 888,716 | Lively | May 26, 1908 |
| 1,010,949 | Polyerino | Dec. 5, 1911 |
| 1,360,532 | Issaes et al. | Nov. 30, 1920 |
| 1,521,650 | Rudolf | Jan. 6, 1925 |
| 2,268,619 | Reid | Jan. 6, 1942 |
| 2,300,644 | Boyd | Nov. 3, 1942 |

FOREIGN PATENTS

| | | |
|---|---|---|
| 720,762 | Great Britain | Dec. 29, 1954 |

OTHER REFERENCES

Electronic Engineering, "Telescopic Mountings in Electronic Equipment," pp. 27–31, Jan. 1950.

Communication Engineering, March-April, 1953, "Hand-Carried 2-Way FM Equipment," pp. 28–30.

Radio News, Aug. 1944, "Weather Testing Walkie-Talkies," pp. 32.

Radio & Television News, Aug. 1953, "Six Meter Emergency Transceiver," pp. 56, 58, 77.